United States Patent [19]
Frisoli

[11] Patent Number: 5,528,803
[45] Date of Patent: Jun. 25, 1996

[54] DOUBLE LOCKING CINCH SACK WINCH LOCK

[76] Inventor: David M. Frisoli, 17 Windnt Rd., Kendall Park, N.J. 08824-1317

[21] Appl. No.: 209,075

[22] Filed: Mar. 11, 1994

[51] Int. Cl.$^6$ ............................................. A44B 21/00
[52] U.S. Cl. ...................... 24/712; 24/68 R; 24/30.5 R
[58] Field of Search ................... 242/395.1, 396.1, 242/388.1, 586.1; 24/68 R, 712, 712.1, 68 CD, 68 B, 30.5 R; 40/665; 383/74

[56] References Cited

U.S. PATENT DOCUMENTS

| | | | |
|---|---|---|---|
| 629,139 | 7/1899 | Steinmetz | 242/395.1 |
| 765,204 | 7/1904 | Searles | 242/396.1 |
| 816,328 | 3/1906 | Holt | 242/396.1 |
| 1,111,489 | 9/1914 | Palmer | 242/396.1 |
| 1,364,031 | 12/1920 | Brenizer | 242/396.1 X |
| 4,506,415 | 3/1985 | Swift | 40/665 X |
| 5,311,688 | 5/1994 | Aeschbacher et al. | 40/665 |

FOREIGN PATENT DOCUMENTS

| 1812225 | 6/1969 | Germany | 242/586.1 |
|---|---|---|---|

*Primary Examiner*—James R. Brittain
*Attorney, Agent, or Firm*—Richard S. Roberts

[57] ABSTRACT

There is described a winch lock assembly which serves to cinch a sack and its contents closed, thereby locking said contents inside said sack, and at the same time, containing the cinch cord within the winch lock assembly. The winch lock includes a crank assembly, to hand-wind the cinch cord on a shaft inside said winch lock body. When said cinch cord is adequately wound up in order to close the cinch sack, additional force may be applied to said cord with the thumb and index finger of the hand, without said cord unwinding between said torque strokes, due to the clutch-breaking effect of the wound-up cord inside said winch lock body. The crank handle is pivotally mounted on a crank assembly, so as to be folded into crank assembly, thereby locking the crank assembly to said winch lock body.

This is accomplished by a locking surface on the crank handle that moves into slots cut into the winch lock body when said handle is folded into the crank assembly. Also, to insure that the crank handle remains in the locked position, there is a means associated with the crank handle assembly, a locking lug to secure a spring loaded crank handle bearing into the locked position. The cinch cord and the double locking mechanism are all self-contained into a single unit, and the winch lock assembly is reusable. This invention has utility in packaging and storing, or in mailing facilities, especially where goods are stored or shipped in huge quantities. Also provided is a means to secure a name/address plate on the winch lock body.

7 Claims, 2 Drawing Sheets

DOUBLE LOCKING CINCH SACK WINCH LOCK

BACKGROUND OF THE INVENTION

This invention relates to a cinch sack type of container for storing or shipping huge quantities of material or mail.

Cinch sacks that are re-usable and conventionally known, and for the purpose of this invention, we will not be concerned with disposable types that are not re-usable such as waste or garbage sacks.

Cinch sacks have been around for many years. Cinch sacks come in different basic structures, mostly bag shaped with a cinch cord sewn into the opening or mouth of the sack. The cinch cord is free to slide through the sewn opening with both ends coming out one side of the sack. The ends of the cord could be pulled together to seal the mouth or opening by hand, then they could be secured by tying a knot to hold it shut. Although this would secure the contents, there are no means for untying said knot, which could prove difficult, depending on who tightened it; and what type of not one wishes to use. Handling the sack may either tighten the knot more or unravel it. In each case, the result could lead to loose content, or make it impossible to untie.

Another structure involves eye-lets that are crimped into the sack opening and the cinch cord weaved in and out of them and both ends of the cinch cord exit out of one eye-let on one side of the sack opening. This type of sack can also be tied in order to secure the contents. However, the same disadvantages will prevail.

Another disadvantage to this, is that there are no means of labeling the contents or where it is to be delivered. Most packing or mailing facilities use a name/address card holder to secure a pre-printed precut name/address card. The name/address card holder also performs the functions of locking the cinch cord. These two functions are common in postal facilities throughout the world. The cinch lock as is conventionally known, performs two functions only. They lock up the cinch sack and provide a means for securing the name/address plate or card.

There are two major faults with the standard cinch lock system that needs to be addressed:

The locking system can come loose by dropping or handling alone causes them to unlock. In this case, the contents escape the sack, then said contents are either lost or damaged beyond repair by the machinery that moves the sacks. In one configuration, the cinch cord is wrapped around a plastic name plate which has notches to secure the cord. This is very unreliable and not much better than a knot. The other configuration involves a wing lock lever that pinches the cinch cord against an inside cord guide that is mounted on a name/address card holder, that sometimes breaks off. The locking lever has no means of being held in the locking position, but a loop is provided to either lace the remaining cinch cord through or to add a locking device to it, which is never provided as part of the unit. Most of the time, the cinch cord is not laced through the loop, since most personnel feel it is too time consuming to implement. Even when the cord is implemented to lock the lever, it leaves a lasso loop on the cinch cord to be caught on the bulk conveyors or machinery, or it may be untied in transport by said machinery. Either way, it leaves the cinch cord in a position to get hooked onto something that it is not supposed to. As another fault, conventional cinch locks allow the cinch cord to hang. Most of these locking devices that are presently used on mail cinch sacks were designed before automation in moving and sorting sacks. Cinch sacks were moved by hand, trucks or sorted manually. With the advent of sack sorting machines and bulk conveyors and the like, sacks having their cords hanging, proved to be incompatable with the machinery.

Millions of dollars are lost on a daily basis due to these two faults or shortcomings. Motors burn up when sacks are drawn into pulleys by their cores; belts get torn beyond repair; mail gets pulled off machines in sorting, or gets mis-sent, or jammed up, causing more sacks to tear open and lose mail after they open. Sacks that contain empty sacks for relocation are unlocked and still more loose sacks jam up more equipment. The cycle never ends. Sacks that are mis-sent risk more spills of loose contents. This jamming cycle also presents a safety problem. These jam ups introduce problems too numerous to itemize at this time.

Based on such circumstances, it is the object of this invention to provide a device that is double locking and self contained, so that the cinch cord is not hanging and so that the locking device can not come loose under any circumstances. It is also the object of this invention to provide a means of unlocking that absolutely can not occur unless it is unlocked on purpose by human hands only, not by a machine. It is also an object of this invention to provide a means of simple closing and tightly sealing by hand, and double locking without any further effort on the part of personnel.

SUMMARY OF THE INVENTION

The invention provides a winch assembly inside a winch lock body for the purpose of winding up a cinch cord around a shaft as the crank handle is turned by hand or by other means. The crank assembly has a flange section outside of the winch lock body that is integral with the shaft part of the crank. The crank handle is pivotally mounted so as to be in either of two positions. In a first position, said crank handle acts to facilitate winding the cinch cord around the shaft, thereby sealing the cinch sack. When the user is satisfied that the sack is properly closed, the user can apply additional force to firmly seal the sack by turning the crank assembly with his or her thumb against the raised section of said flange where the crank handle is mounted with his or her index finger against the raised section of the flange where the crank handle locking lug is located, which is opposite the raised section of the crank handle. Users thumb can push against the raised section of the flange corresponding to the locking lug and index finger against the crank handle mounting, thereby turning the crank shaft in 180 degree increments as one would turn a large wing nut.

When the user is satisfied that the cinch sack is closed sufficiently tight, on can swing crank handle toward the center so that the end of crank handle contacts the locking lug on the flange. The locking surface of the handle lines up with a cut-a-way slot in the winch lock body, thereby locking said cinch sack winch lock. By pushing down on the crank handle, the end of a spring loaded crank bearing locks on the flange locking lug or raised portion of the flange. This is the second position of the crank handle, which makes it double locked.

To open, one must push the crank handle bearing away from flange locking lug with user's thumb and index finger and, at the same time, pivot the handle out away from crank handle flange to assume the first position which is in the unlocked position. With the user's hand, pull the cinch sack winch lock body away from the sack until the cord stops unwinding. The sack is now open.

BRIEF DESCRIPTION OF THE DRAWIGS

DETAILED DESCRIPTION OF THE PREFERRED EMBODIMENT

Figure 1:
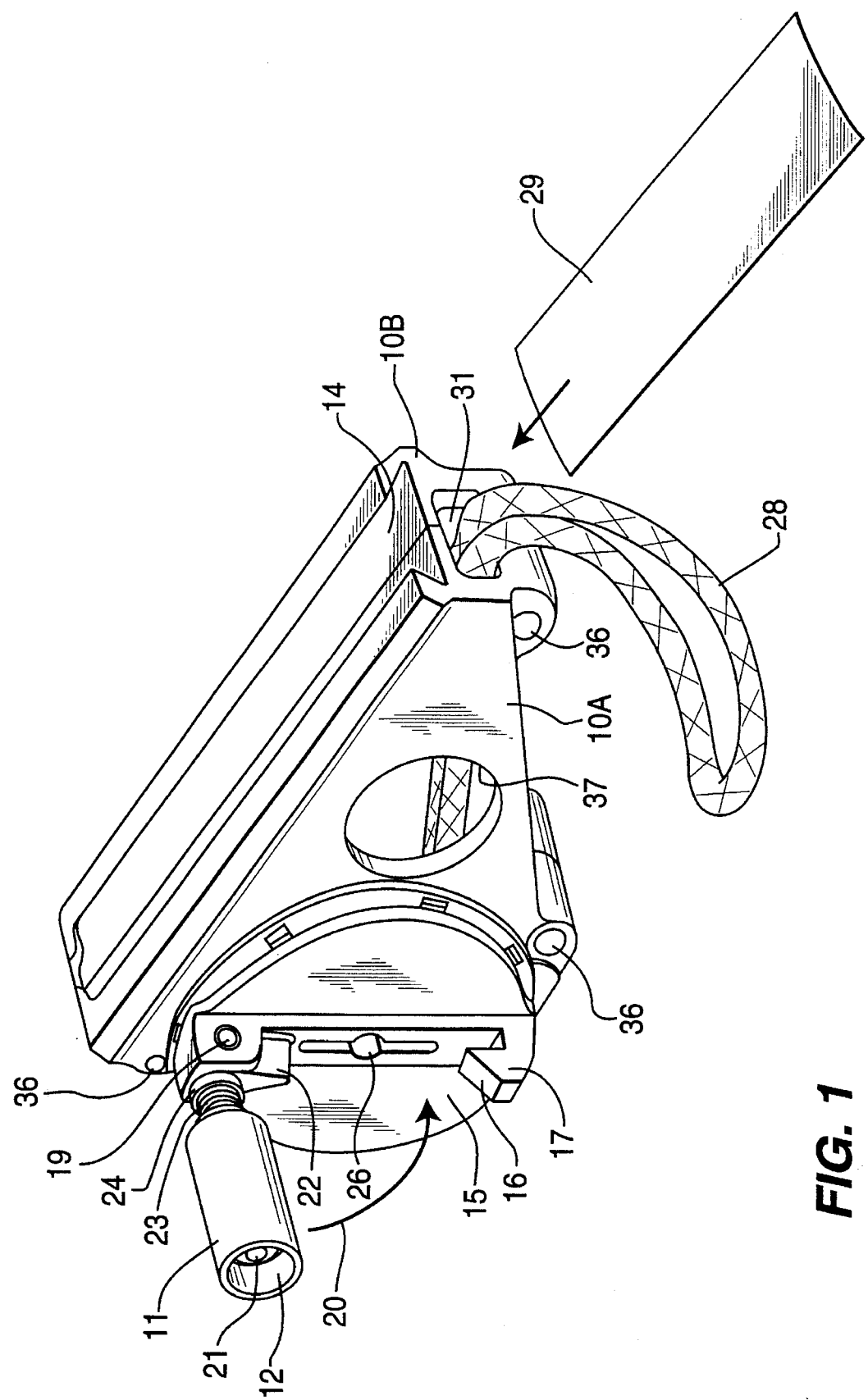
FIG. 1 shows a three dimensional view of the double locking cinch sack winch lock according to the invention.

Referring to FIG. 1, there is shown a double locking cinch sack winch lock.

The cinch sack cord 28 is shown wound up most of the way on a fully assembled unit, less the cinch sack. The sack is now shown, since it is conventionally known.

The cinch sack cord 28 is shown wound up most of the way on a fully assembled unit, less the cinch sack. The sack is not shown, since it is conventionally known.

The cinch sack winch lock assembly consists of a winch lock body (10A and 10B). 10A is screwed to 10B with screws or rivets 36. There are three screws to hold the body 10A and 10B together according to FIG. 2.

Figure 2:
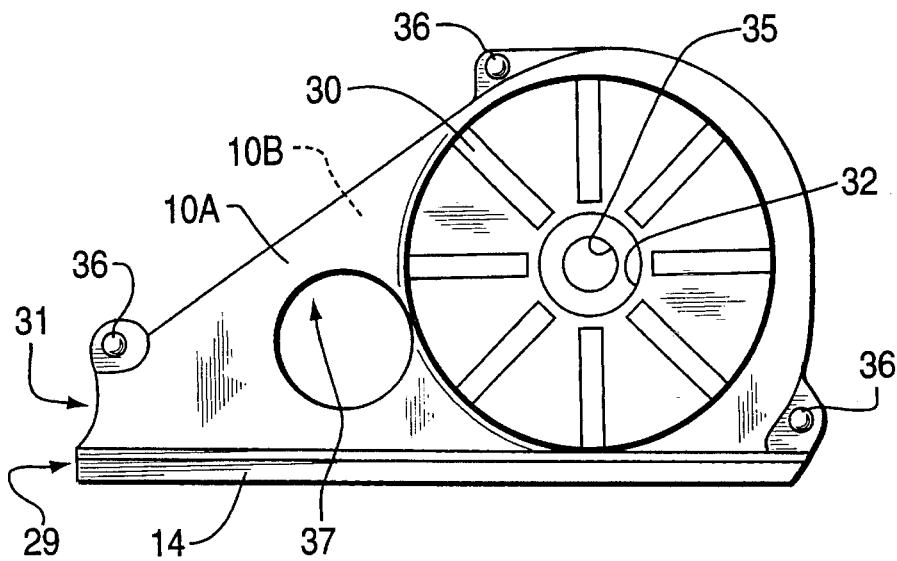
FIG. 2 shows a side view of the cinch sack winch lock body.
Figure 3:
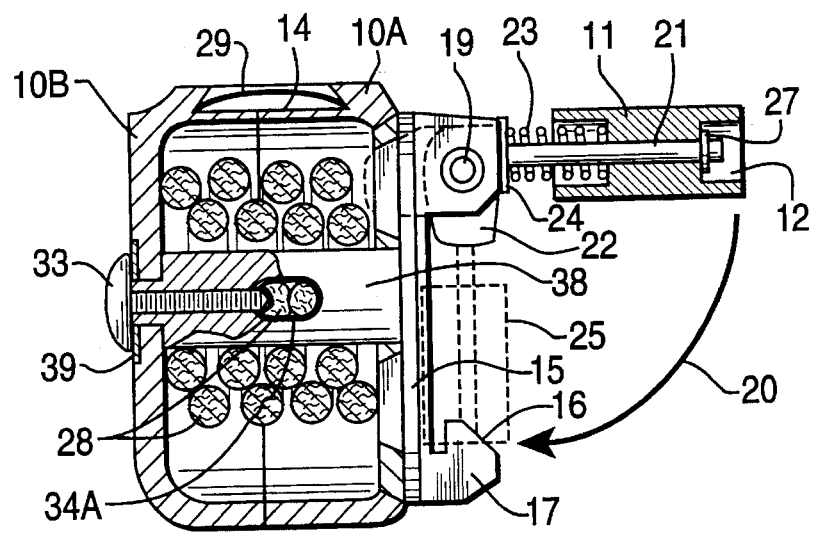
FIG. 3 shows a rear view, cut-a-way of the cinch sack winch lock assembly shown in the crank mode, unlocked.
Figure 4:
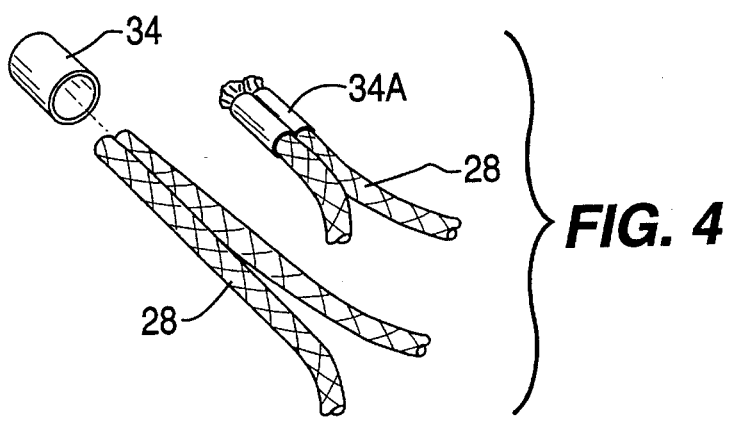
FIG. 4 shows the cinch sack cord before a crimp sleeve is installed and after it is installed with the sleeve crimped on the cord according to this invention.

Referring to FIG. 3, the crank includes crank flange 15, hand crank locking lug inclined surface 16, locking lug 17 and crank shaft 38 all integrally formed as a zinc alloy die casting. Numbers 15, 16 and 17 are shown on FIG. 1, but shaft 38 is shown only in FIG. 3. Cinch cord 28 is shown on FIG. 1, 3 and 4. Name/address plate or card 29 slides on to slot 14 on top of cinch lock body 10A and 10B, FIGS. 1, 3 and 10A–B of FIG. 2.

The crank handle 21 and locking surface 22 are integral and formed as one part from sheet steel pressed to form a round surface 21 in FIGS. 1 and 3. Crank handle 21 and locking surface 22 are pivotally mounted on a raised portion of crank flange 15 by the pivotal pin 19 shown on FIGS. 1 & 3.

FIGS. 1 and 3 show the crank handle in the unlocked position, in hand crank mode, or as previously referred to as being in the first position. FIG. 3 shows the position of the double locked mode 25 in dotted liens. Arrow 20 of FIGS. 1 and 3 show the direction that crank handle must travel to reach position two as previously mentioned as the double locked mode.

As crank handle travels the path 20, the locking surface of crank handle will go into a cut-a-way slot 30 of FIG. 2 in cinch lock body 10A as shown in FIG. 3 by dotted lines. The crank handle bearing 11 is mounted on crank handle 21 and is held in place by a "C" retaining ring 27. The crank handle bearing is under spring pressure from spring 23, which pushes outward against the "C" ring 27 and slot 24. When the crank handle is forced down so that locking surface 22 goes into slot 30 of cinch lock body, the system is effectively locked. However, as the crank handle bearing 11, area 12 comes in contact with the inclined surface of the locking lug 16, additional force is necessary on the bearing to overcome the spring 23. Once the bearing is pushed adequately enough to compress spring 23, causing the bearing surface 12 to clear lug surface 16, the spring pushes bearing 11 into the locking lug 17, which secures the bearing by its surface 12. At this point, the cinch sack winch lock is in the double locked mode. In order to pull the handle out of this mode, the bearing must first be pushed away from lug 17 against the pressure exerted by the spring 23, then it must be lifted out of this engagement using force from one's thumb and index finger. It can not be taken out of this engagement by accident. Only the human hand can exert this kind of force in this exact manner.

Another important feature of the double locking cinch sack winch lock is that the locking surface 22 is positively engaged on the cut-a-way slots 30 in the cinch lock body 10A and 10B, not on the cord 28. This feature not only gives an absolute locking surface which in itself is locked, but will increase the life expectancy of the cinch sack cord.

It is also an object of this invention to maintain simplicity without introducing too many parts. The cinch lock body can be composed of plastic, polypropalene or a polyurethane resin. 10A and 10B are preferably riveted together as shown in FIG. 2. The crank assembly consists of a shaft 38, flange 15, 16, 17 are all integrally formed from a single zinc alloy die casting. The entire crank assembly includes 19, 12, 11, 21, 27 and 12 are inserted into the cinch lock body through apertures 32 and 35 of FIG. 2, and are held in place by a single screw 33 and fiber washer 39. The holding screw 33 performs two functions that support each other. The cinch lock cord is first laced or looped though the openning of a cinch sack, not shown. Once the cord is installed on the sack, the two ends of the cord are cut and inserted into a thin copper or brass sleeve 34, as shown on FIG. 4. Once the sleeve 34 is crimped onto the cord 28, the crimped sleeve designated as 34A, is inserted into the aperture 31 of the cinch lock body of FIGS. 1 and 2. The access hole 37 of FIGS. 1 and 2 is used along with a rear end slotted hole, not shown, to insert the crimped end of cinch cord 34A of FIG. 4, into the slotted hole of the shaft 38 of the crank assembly. As the crimped end of the cord 34A is inserted all the way through shaft 38, the retaining screw 33 is screwed into the shaft as shown in FIG. 3 until the screw's head bottoms onto the shaft's end. At this point, the pointed end of the screw indents the crimped sleeve of the cord, thereby retaining cinch lock cord and the crank assembly.

In FIG. 1, a slot and hole combination 26 may be wound with a power screwdriver to seal closed many sacks at one time;

I claim:

1. A winch assembly comprising a substantially enclosed winch body having front, rear, top, bottom and first and second opposite side walls defining a central hollow cavity; a shaft having two ends, a first end of the shaft being mounted for rotation on a portion of the first side wall within the cavity and extending through the cavity perpendicularly from the first side wall and through the second side wall; a rotatable crank assembly positioned on the winch body at a portion of the second side wall outside of the cavity; said crank assembly comprising a generally circular disk attached at its center to a second end of the shaft; a crank flange attached to the disk on a disk surface away from the winch body, and extending across the diameter of the disk; a crank handle having an attached, locking surface projecting perpendicular to the crank handle, the crank handle and locking surface each being pivotally attached to one end of the crank flange and being capable of alternately extending from a position perpendicular the plane of the disk to a position parallel to the plane of the disk; wherein when the crank handle is positioned perpendicular to the disk, the locking surface is in an unlocked position parallel to the disk and positioned outside of the cavity, and when the crank handle is positioned parallel to the disk, the locking surface is in a locked position perpendicular to the disk and disposed through openings in the crank flange, the disk and the second side wall into the cavity; a locking lug extending outwardly from another end of the crank flange; the crank handle comprising a shaft, a spring retained around the shaft and a crank handle bearing retained around the spring such that the crank handle bearing is capable of compressing and relaxing the spring by traversing along the shaft; the crank handle bearing having a depression at an end thereof capable of locking with the locking lug when the crank handle is in a position parallel to the disk.

2. The winch assembly of claim 1 wherein the second side wall has a plurality of spaced openings capable of accepting the locking surface therethrough.

3. The winch assembly of claim 1 wherein the front wall has an opening therethrough and a cinch cord is disposed through the opening and attached to the shaft inside of the cavity.

4. The winch assembly of claim 3 wherein the ends of the cinch cord are bound together by a crimped sleeve and the cinch cord is attached to the shaft by a holding screw positioned through the sleeve.

5. The winch assembly of claim 3 further comprising a sack and a portion of the cinch cord being slidably disposed around an opening in the sack.

6. The winch assembly of claim 1 further comprising a channel along the top wall capable of receiving and retaining identification means.

7. The winch assembly of claim 1 wherein the crank flange has a central slot capable of cooperating with a screwdriver bit to rotate the shaft.

\* \* \* \* \*